United States Patent [19]

Iwatsubo

[11] Patent Number: 5,293,498
[45] Date of Patent: Mar. 8, 1994

[54] ARRANGEMENT OF DESIGNATION OF DRIVE ELEMENT NUMBER USING MOTHER BOARDS

[75] Inventor: Masahito Iwatsubo, Kawasaki, Japan

[73] Assignee: Fujitsu Limited, Japan

[21] Appl. No.: 49,879

[22] Filed: Apr. 19, 1993

Related U.S. Application Data

[63] Continuation of Ser. No. 765,995, Sep. 26, 1991.

[30] Foreign Application Priority Data

Sep. 28, 1990 [JP] Japan ................................. 2-259073

[51] Int. Cl.$^5$ ............................................. G06F 13/14
[52] U.S. Cl. ............................... 395/325; 364/DIG. 2;
364/929.5; 364/927.99; 364/952.1; 364/957.2;
364/947.2
[58] Field of Search ........................ 395/275, 325, 425

[56] References Cited

U.S. PATENT DOCUMENTS

| | | | |
|---|---|---|---|
| 5,023,831 | 7/1991 | Bonke | 395/275 |
| 5,058,004 | 10/1991 | Ravid | 395/275 |
| 5,077,736 | 12/1991 | Dunphy | 371/10.1 |
| 5,097,439 | 3/1992 | Patriquin et al. | 395/425 |

FOREIGN PATENT DOCUMENTS

61-264462 11/1986 Japan.
1-100649 4/1989 Japan.
2-70250 5/1990 Japan.

*Primary Examiner*—Debra A. Chun
*Attorney, Agent, or Firm*—Welsh & Katz, Ltd.

[57] ABSTRACT

An arrangement of a designation of a drive element number using mother boards interposed between an upper grade device and a plurality of drive elements includes a plurality of groups of drive elements, each of which drive elements has a specifically designated drive element number, an upper grade device for carrying out a signal communication through tag bus line cables with a selected drive element, and a plurality of mother boards interposed between the upper grade device and the plurality of drive elements, each of the mother boards corresponding to one of the plurality of groups of drive elements. The plurality of mother boards has a same potential level arrangement of connection pins for a drive element number designation in connecting portions.

8 Claims, 12 Drawing Sheets

| PIN NUMBER | | No. 1 | No. 2 | No. 3 |
|---|---|---|---|---|
| WEIGHT | | 1 | 2 | 4 |
| DRIVE ELEMENT NUMBER | No.0 | HIGH | HIGH | HIGH |
| | No.1 | LOW | HIGH | HIGH |
| | No.2 | HIGH | LOW | HIGH |
| | No.3 | LOW | LOW | HIGH |
| | No.4 | HIGH | HIGH | LOW |
| | No.5 | LOW | HIGH | LOW |
| | No.6 | HIGH | LOW | LOW |
| | No.7 | LOW | LOW | LOW |

ARRANGEMENT OF DESIGNATION OF DRIVE ELEMENT NUMBER USING MOTHER BOARDS

This is a continuation of copending application Ser. No. 07/765,995, filed on Sep. 26, 1991.

BACKGROUND OF THE INVENTION

1. Field of the Invention

The present invention relates to an arrangement of a designation of a drive element number using mother boards interposed between an adapter, as an upper grade device, and a plurality of drive elements. A mother board is a printed circuit board having connecting portions enabling a connection between a plurality of circuits. The arrangement according to the present invention is used, for example, for an interface circuit used in connection with an adapter for a magnetic disk storage and a plurality of drive elements for the magnetic disk storage.

2. Description of the Related Arts

For example, in a magnetic disk storage apparatus in which a plurality of drive elements are controlled by a single adapter, usually one or a plurality of mother boards are connected between the tag bus line of the adapter and the plurality of drive elements. The designation of the drive element number is carried out by designation the potentials of a predetermined number of pins of the connecting portion of a mother board to a LOW or logic HIGH level of potential, in the mother board.

By connecting the drive portions to the mother board through connection arrangement, the acknowledgement of an own drive element number is automatically carried out by a drive element based on the condition of the connection predetermined connection pins, and a control of only a specific drive element having a drive element number coinciding with the drive element number designated from the adapter is carried out.

It is possible to use a plurality of mother boards which are interposed between the adapter and the drive elements, but the size of a print circuit board for a single mother board tends to be increased as the number of drive elements connected to the single mother board is increased; this increase of the size of a print circuit board for the mother board can be avoided if the plurality of mother boards are used.

When two mother boards, i.e., first and second mother boards, are used between an adapter and a plurality of drive elements, e.g., No. 0 to No. 7 drive elements, the first mother board is used for No. 0 to No. 3 drive elements, and the second mother board is used for No. 4 to No. 7 drive elements.

In each of first and second mother boards, connection terminals corresponding to, for example, bits $b_0$, $b_1$, and $b_2$ of a drive element number, are included in connection terminals of a connecting portion for the drive side, to constitute the connections corresponding to the drive element numbers.

Nevertheless, a problem arises in that, since the drive element numbers of the drive elements connected to the first mother board are different from those of the second mother board, different arrangements of the connecting portions are required for the first and second mother board, and accordingly, the provision of two kinds of mother boards becomes necessary. This causes an undesirable complication of the structures of the mother boards, the occurrence of inadvertent failures in the drive element number designation, an increase of the number of components, complications of the manufacturing process, and an increase of the manufacturing cost.

SUMMARY OF THE INVENTION

An object of the present invention is to provide an improved arrangement of the designation of a drive element number using a plurality of mother boards interposed between an upper grade device and a plurality of drive elements, in which the designation of drive number is carried out automatically through the connections between the plurality of mother boards and the plurality of drive elements.

Another object of the present invention is to realize an improved arrangement of the designation of a drive element number using a plurality of mother boards interposed between an upper grade device and a plurality of drive elements, without an occurrence of the above-described undesirable situations of, e.g., a complication of the structures of the mother boards, an occurrence of inadvertent failures in the drive element number designation, an increase of the number of components, a complication of the manufacturing process, and an increase of the manufacturing cost.

In accordance with the present invention, there is provided an arrangement of a designation of a drive element number using mother boards interposed between an upper grade device and a plurality of drive elements including a plurality of groups of drive elements, each of which drive elements has a specifically designated drive element number, an upper grade device for carrying out a signal communication through tag bus line cables with a selected drive element, and a plurality of mother boards interposed between the upper grade device and the plurality of drive elements, each of the mother boards corresponding to one of the plurality of drive element groups, wherein the plurality of mother boards has the same potential level arrangement of connection pins of a connecting portion, for a drive element number designation in connecting portions of the mother boards.

DESCRIPTION OF THE PREFERRED EMBODIMENTS

Figure 1:
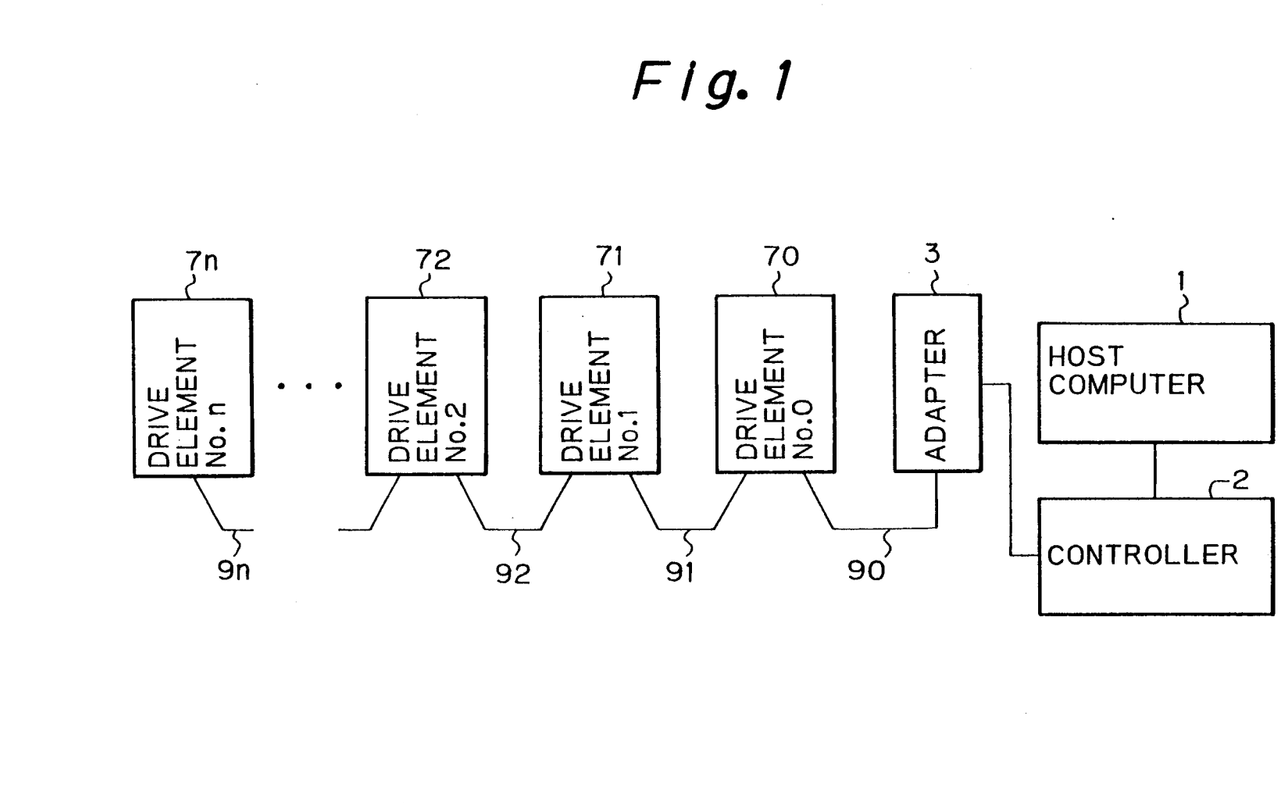
FIG. 1 shows an example of a prior art arrangement of drive elements and an adapter for an interface circuit for a disk type storage.

Before describing the preferred embodiments, a prior art arrangement of the designation of a drive element number will be explained with reference to FIG. 1 and FIG. 2. An example of a prior art arrangement of drive elements and an adapter for an interface circuit for a disk type storage is as shown in FIG. 1. A plurality of drive elements Nos. 1 to n (70 to 7n) are connected through cables 90, 91, 92 . . . 9n to an adapter 3, as an upper grade device, controlled by a controller 2, which is controlled by a host computer 1.

The selection of a drive element is carried out by transmitting information containing a drive element number to be selected and a selection command to drive elements 70, 71, . . . 7n through cables 90, 91, ... 9nthe adapter 3. When a drive element receives this information and acknowledges that the drive element number to be selected from the information is the same as the own drive element number, this drive element executes the subsequent instructions transmitted from the adapter 3.

To avoid an undesirable abnormal control between the drive elements and the adapter, caused by inadvertent duplicate selections of drive elements due to an erroneous designation of a drive element number by the setting of designation switches in the drive elements, and to simplify the cable connection as an interface circuit between the adapter and the drive elements, mother boards which are printed circuit boards having connecting portions applicable for a connection between a plurality of circuits can be used.

Figure 2A:
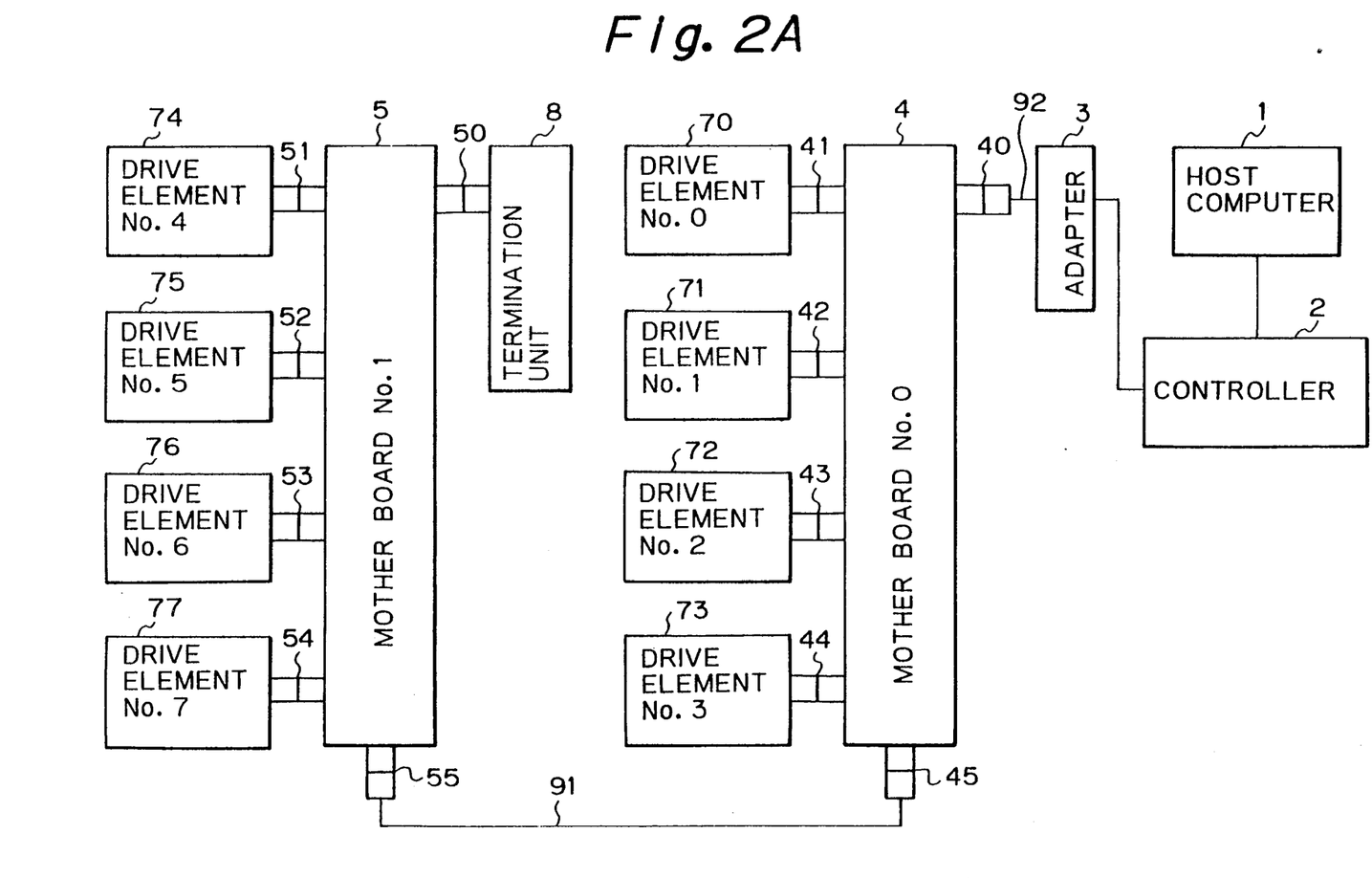
FIG. 2A shows an example of a prior art arrangement of drive elements and an adapter using mother boards.
Figure 2B:
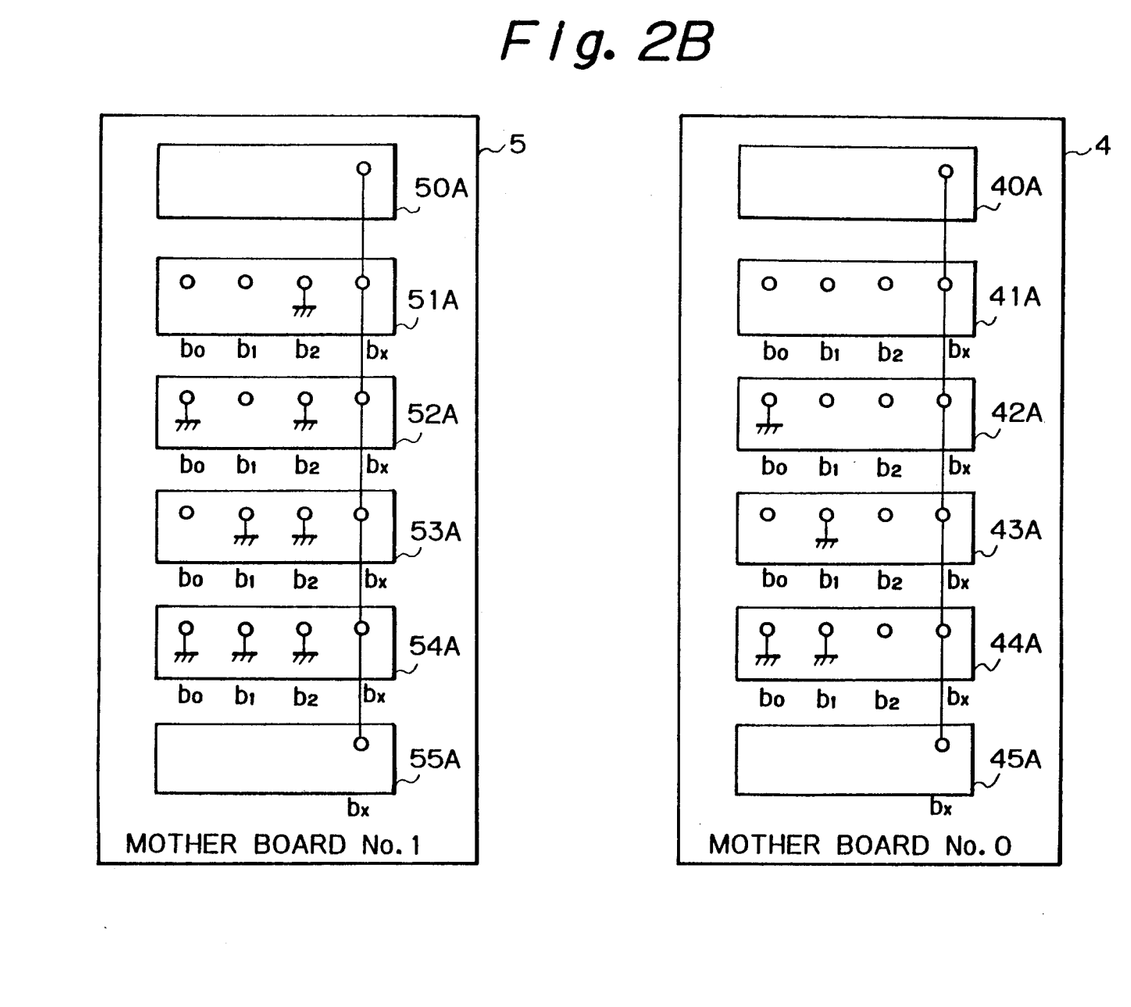
FIG. 2B shows the arrangement of the connecting portions in the mother boards of the arrangement of FIG. 2A.

An example of a prior art arrangement of drive element and an adapter using mother boards, and the arrangement of the connecting portions thereof, are shown in FIGS. 2A and B.

The adapter 3 controlled by the controller 2, which is controlled by the host computer 1, is connected through a cable 92 to the mother board No. 0 (4); the drive element Nos. 0, 1, 2, and 3 (70, 71, 72, and 73) are connected to the mother board No. 1 (4); the mother board No. 1 (5) is connected through a cable 91 to the mother board No. 0 (4); and the drive element Nos. 4, 5, 6, and 7 (74, 75, 76, and 77) are connected to the mother board No. 1 (5).

The designation of the drive element number is carried out by designating the potential levels of bits $b_0$, $b_1$, and $b_2$ of connection pins in the connecting portions 41A to 44A and 51A to 54A in mother boards 4 and 5. For example, in the connecting portion 41A, bits $b_0$, $b_1$, and $b_2$ of connection pins are not grounded and therefore, can have a HIGH level potential, and in the connecting portion 42A, the bit $b_0$ of connection pin is grounded, and therefore has a LOW level potential, but the bits $b_1$ and $b_2$ of the connection pins are not grounded, and therefore can have a HIGH level potential, and so on.

Since the drive element numbers of the drive elements connected to the mother board 2 are different from those connected to the mother board 1, the arrangements of the potential levels of bits $b_0$, $b_1$, and $b_2$ in the connecting portions are different for the mother boards 1 and 2, and therefore, it becomes necessary to provide different kinds of mother boards.

Figure 3A:
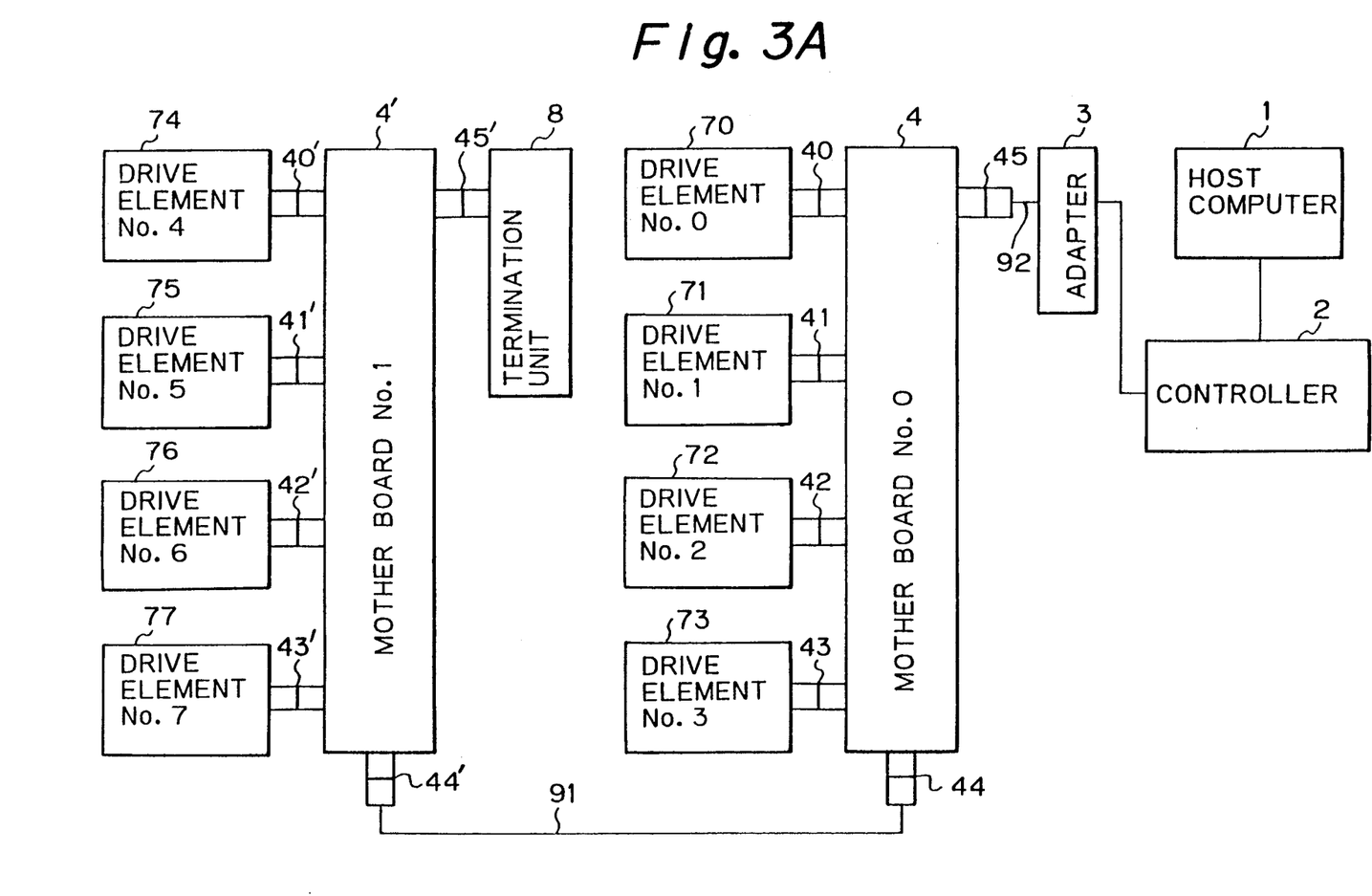
FIG. 3A shows an arrangement of the designation of a drive element number according to an embodiment of the present invention.
Figure 3B:
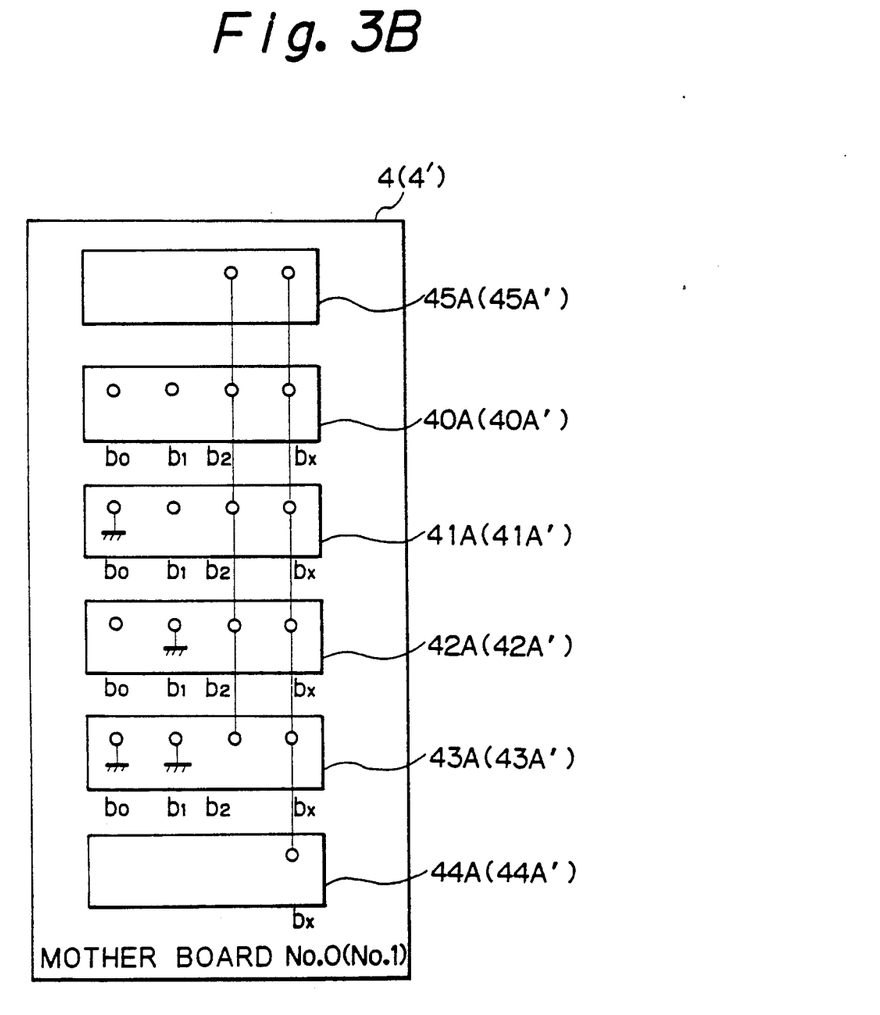
FIG. 3B shows the arrangement of the connecting portions in the mother boards of the arrangement of FIG. 3A.

An arrangement of the designation of the drive element number according to an embodiment of the present invention, and the arrangement of the connecting portions in the mother boards therefor, are shown in FIGS. 3A and 3B. The arrangement shown in FIG. 3A is constituted by a host computer 1, a controller 2, an adapter 3, a mother board No. 0 (4), a mother board No. 1 (4'), drive elements Nos. 0 to 7 (70 to 77), connect couplings (connectors) 40 to 45 and 40' to 45', a termination unit 8, and cables 91 and 92.

Adapter 3 is regarded as one of the upper grade devices, and host computer 1 and controller 2 are regarded as further upper grade devices.

The adapter 3 used for a device such as a magnetic disk storage device receives instructions from the controller 2, which is controlled by the host computer 1 and carries out a selection from among a plurality of drive element Nos. 0 to 7 and a control of the selected drive element.

The mother board No. 0 (4) and mother board No. 1 (4') are connected in series to the adapter 3 through cables 91 and 92, which form tag bus lines.

The structure of the mother board No. 1 (4') is the same as the structure of the mother board No. 0 (4) as shown in FIG. 3B, and thus mother boards having the same structure are used in the arrangement of the designation of the drive element number shown in FIG. 3A.

Drive elements Nos. 0 to 3 (70 to 73) are connected to the mother board No. 0 (4) through connect couplings 40, 41, 42, and 43; drive elements Nos. 4 to 7 (74 to 77) are connected to the mother board No. 1 (4') through connect couplings 40', 41', 42', and 43'; the cable 92 from the adapter 3 is connected to the mother board No. 0 (4) through the connect coupling 45; the cable 91 from mother board No. 0 (4) through the connect coupling 44 is connected to the mother board No. 1 (4') through the connect coupling 44'; and the termination unit 8 is connected to the mother board No. 1 (4') through the connect coupling 45'.

Figure 4:
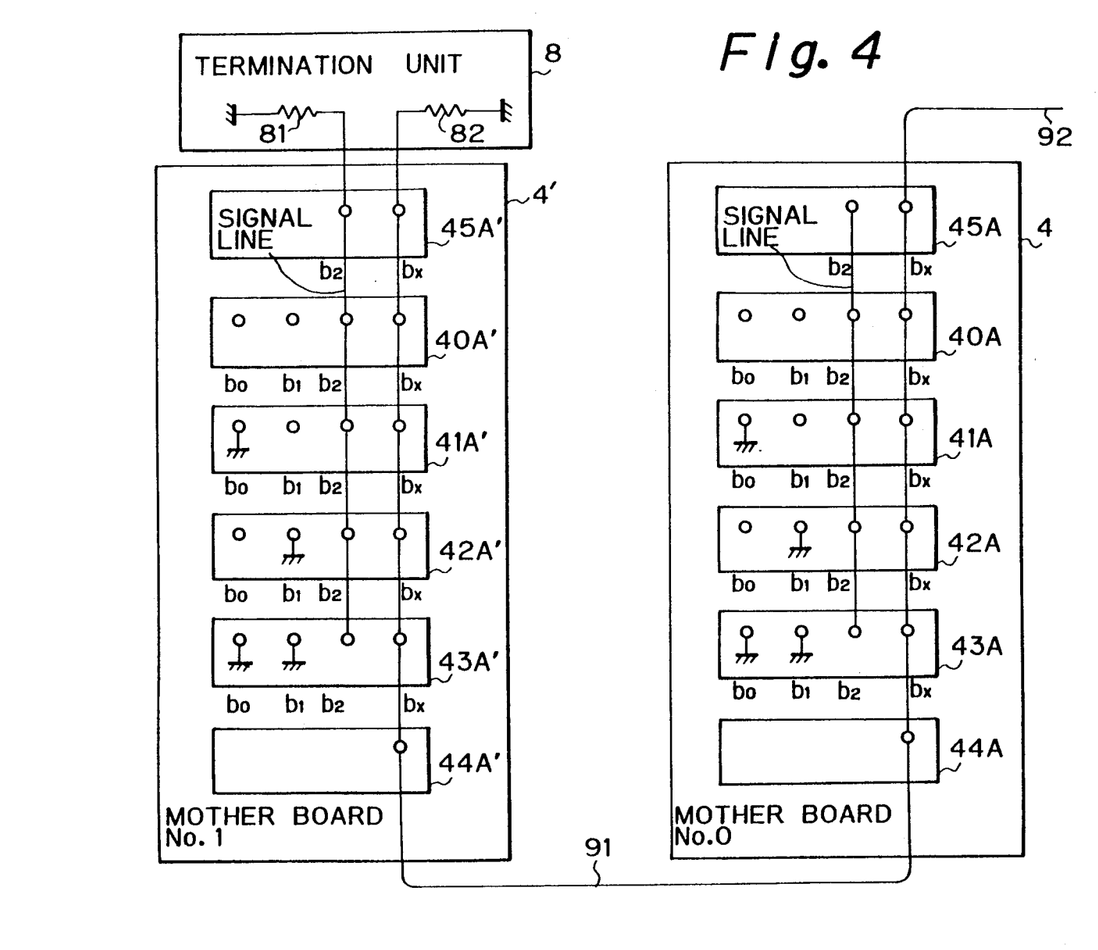
FIG. 4 illustrates electrical connections and logic levels of potentials of the connector pins in the arrangement of a designation of a drive element number according to the embodiment of the present invention.

The structures of the connection portions 40A (40A'), 41A (41A'), 42A (42A'), 43A (43A'), 44A (44A'), and 45A (45A') in the mother board 4 (4') are shown in FIG. 3B, and the manner of the connections by the connection portions 40A (40A') to 45A (45A') is shown in FIG. 4.

In practice, a plurality of connection pins for an interface signal transmission are provided in each of the connection portions (see FIG. 6), but only one pin $b_x$ is illustrated in each of the connection portions in FIG. 3B and FIG. 4, to simplify the explanation.

In each of the connecting portions, pin $b_0$, pin $b_1$, and pin $b_2$ are used for the designation of the drive element number, and when connecting the portion 41 for an adapter, the pin at the position corresponding to the pin $b_2$ is used for the designation of the drive element number.

In the connecting portion 40A, which corresponds to the drive element No. 0 (70), the pins $b_0$ and $b_1$ are not grounded and can have a HIGH potential if connected to a power source voltage. In the connecting portion 41A, which corresponds to the drive element No. 1 (71), the pin $b_0$ is grounded and has a LOW level potential. The pin $b_1$ is not grounded and can have a HIGH level potential if connected to a power source voltage. In the connecting portion 42A, which corresponds to the drive element No. 2 (72), the pin $b_0$ is not grounded and can have a HIGH level potential if connected to a power source voltage. In the connecting portion 43A, which corresponds to the drive element No. 3 (73), each of the pins $b_0$ and $b_1$ is grounded and has a LOW level potential.

The conditions of the pins $b_0$ and $b_1$ in the connecting portions 40A', 41A', 42A', and 43A' in the mother board 4' are the same as those of the connecting portions 40A, 41A, 42A and 43A in the mother board 4, and thus the pins $b_0$ and $b_1$ in each of the connecting portions are used for designating a lower two bits of the drive element number.

The pins of the bit $b_2$ in the connecting portions 40A, 41A, 42A, and 43A are commonly connected to the pin of the bit $b_2$ in the connecting portion 45A, for the adapter in the mother board 4. The bit $b_2$ is used for designating the uppermost bit of the drive element number.

The pins of the bit $b_2$ in the connecting portions 40A', 41A', 42A', and 43A' are commonly connected to the pin of the bit $b_2$ in the connecting portion 45A', for the adapter in the mother board 4'. The bit $b_2$ is used for designating the uppermost bit of the drive element number.

The pin of the bit $b_2$ in the connecting portion 45A for the adapter is in an OPEN state and is not connected to a termination resistor. The potential of the pin of bit $b_2$ in the connecting portion 45A, as well as the potentials of the pins of the bit $b_2$ in the connecting portions 40A, 41A, 42A, and 43A, are at a HIGH level.

Since the termination unit 8 is connected to the mother board 4', the pin of the bit $b_2$ in the connecting portion 45A' for the adapter is connected to the ground through the termination resistor 81. The potential of the pin of the bit $b_2$ in the connecting portion 45A', as well as the potentials of the pins of the bit $b_2$ in the connecting portions 40A', 41A', 42A', and 43A', are made LOW level.

Thus, the uppermost bit $b_2$ of the signal for the drive element number designation, which is designated by the pin of the bit $b_2$ in the connecting portions 40A to 43A in the mother board 4, is at a HIGH level, and the uppermost bit $b_2$ of the signal for the drive element number designation, which is designated by the pin of the bit $b_2$ in the connecting portions 40A' to 43A' in the mother board 4', is at a LOW level.

In accordance with the potential levels of the bits $b_0$, $b_1$, and $b_2$ of the pins in the connecting portions 40A to 43A and 40A' to 43A', which are to be connected to the drive elements Nos. 0 to 7 (70 to 77), an automatic designation of the drive elements Nos. 0 to 3 for the drive elements connected to the mother board 4 and the drive elements Nos. 4 to 7 for the drive elements connected to mother board 4', is achieved.

Figure 5:
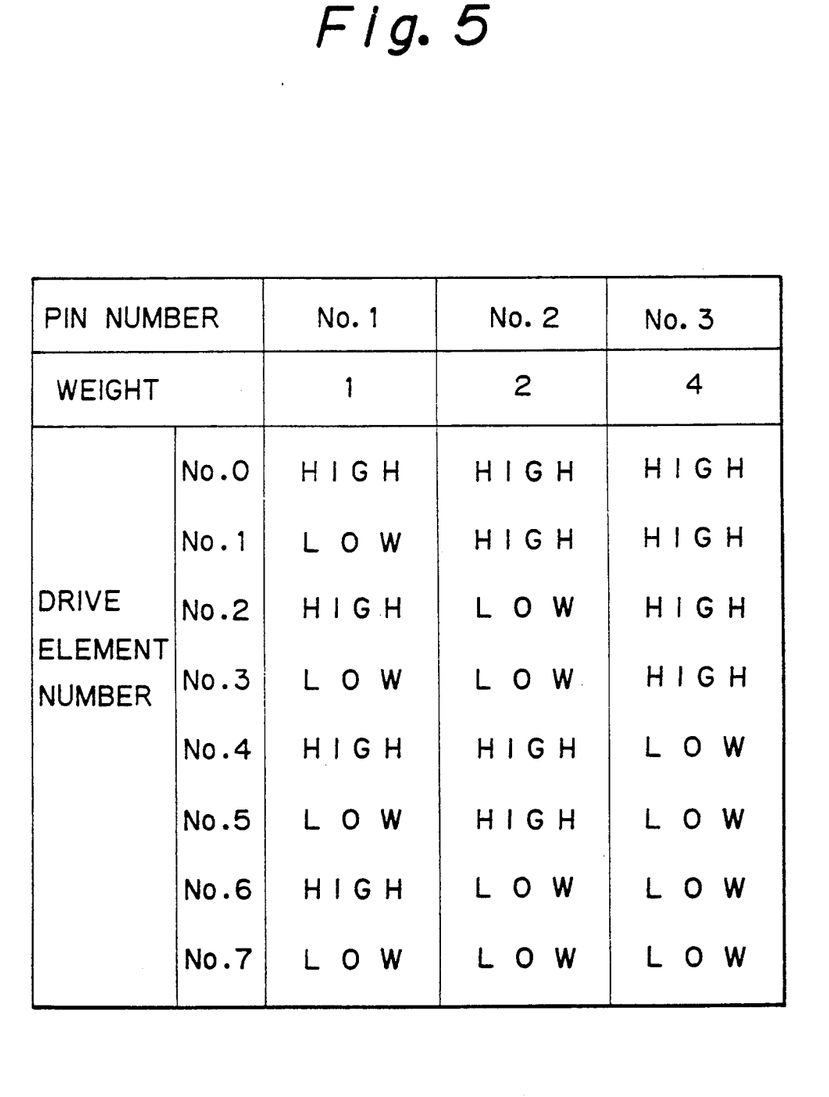
FIG. 5 illustrates a designation of a logic level of a potential of the connection pins.

An example of the logic levels of the potential of the pins for the drive element number designation with respect to the drive element numbers is shown in FIG. 5. In FIG. 5, the HIGH or LOW levels of the potentials of pin Nos. 1, 2, and 3 are shown in a table in correspondence with the drive elements Nos. 0 to 7. As seen from the Table, weight 1 is designated to pin No. 1, weight 2 is given to pin No. 2, and weight 4 is given to pin No. 3. A LOW level potential of a pin is realized by connecting the pin to ground, and a HIGH level potential of a pin is realized by keeping the pin in an OPEN state and able to be connected to a power source voltage.

Figure 6:
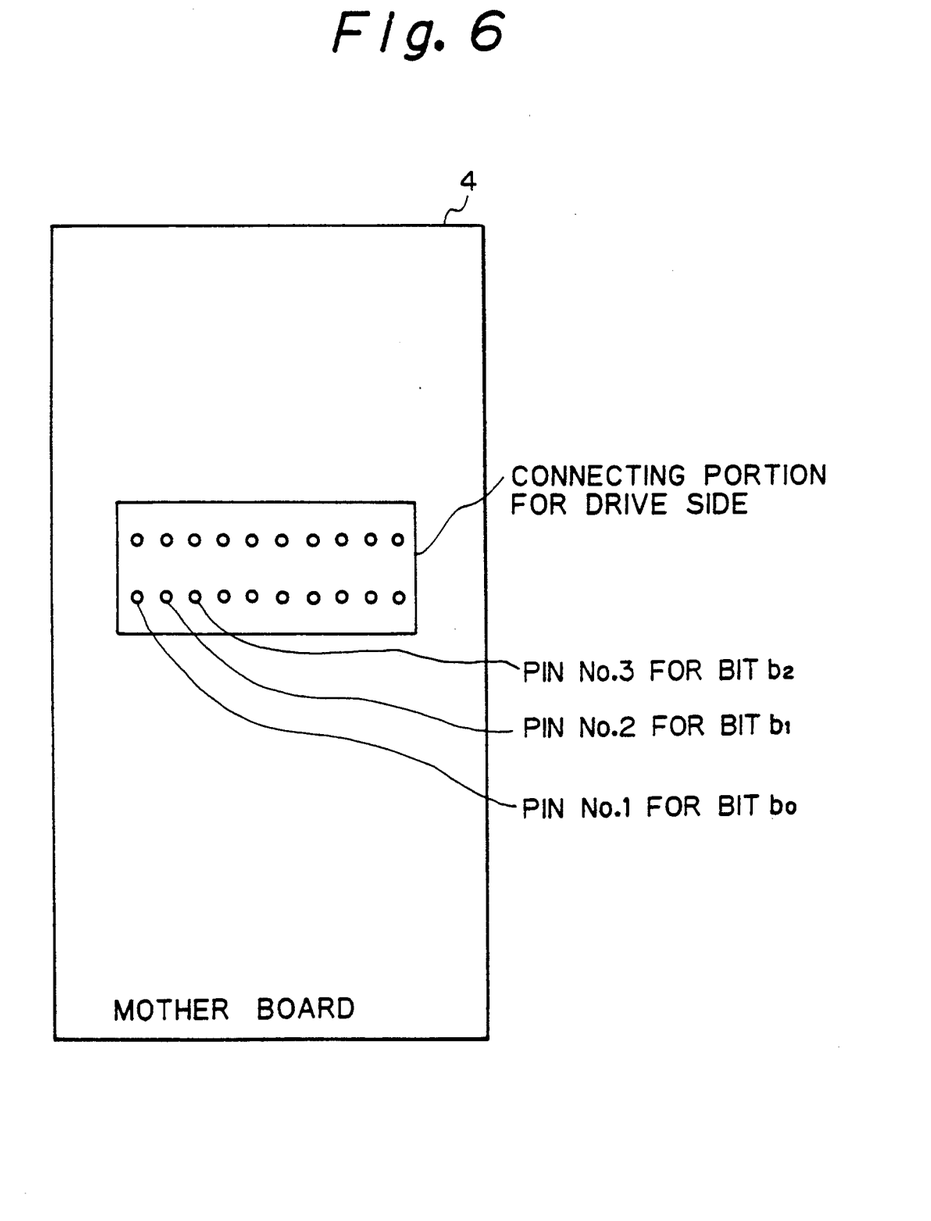
FIG. 6 illustrates an arrangement of connection pins in a connecting portion for a drive element in a mother board.

An example of a practical arrangement of the connection pins in a connecting portion in a mother board is shown in FIG. 6.

Figure 7:
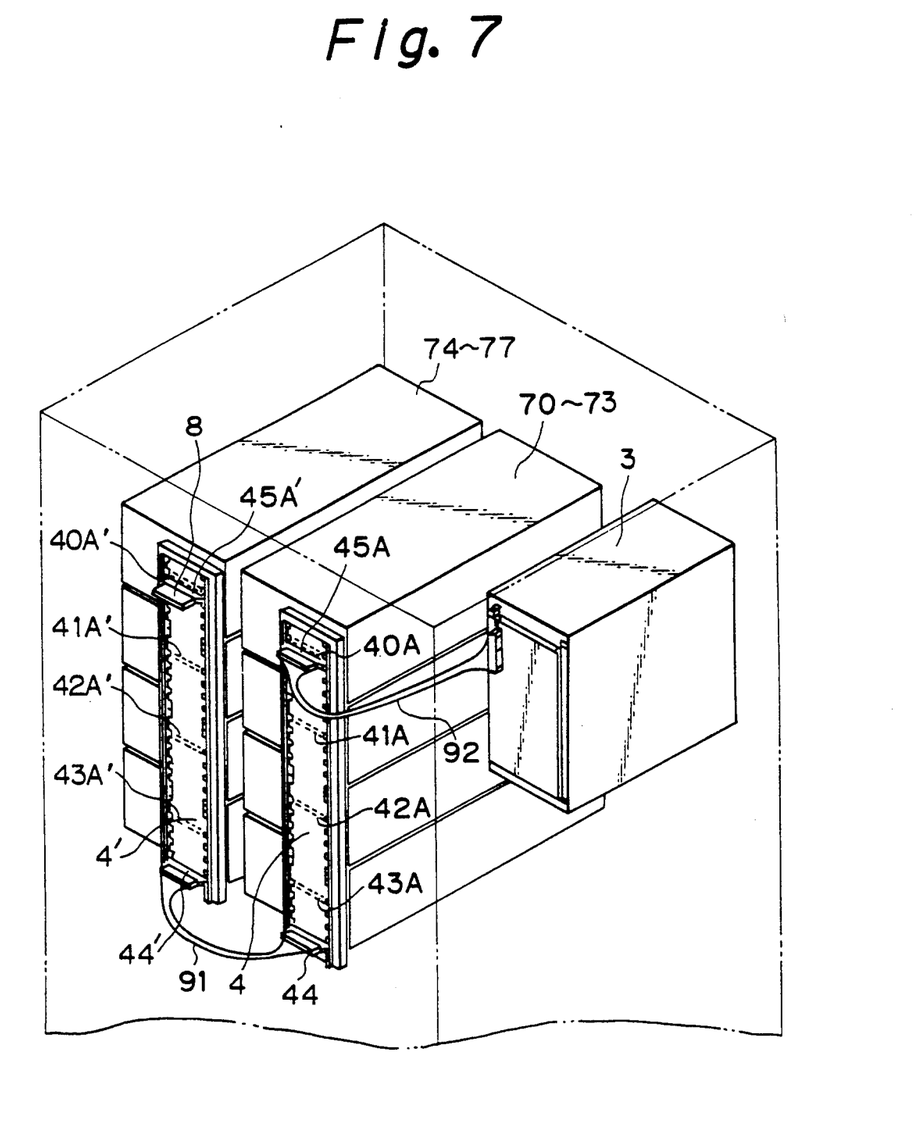
FIG. 7 shows an example of the structures of an adapter, drive elements, connection couplings, and termination units used for the arrangement shown in FIGS. 3A and 3B and applicable to a magnetic disk storage device.

Examples of the structures of an adapter, drive elements, connection couplings, and termination units used for the arrangement shown in FIGS. 3A and 3B applicable to a magnetic disk storage device are shown in FIG. 7.

Figure 8:
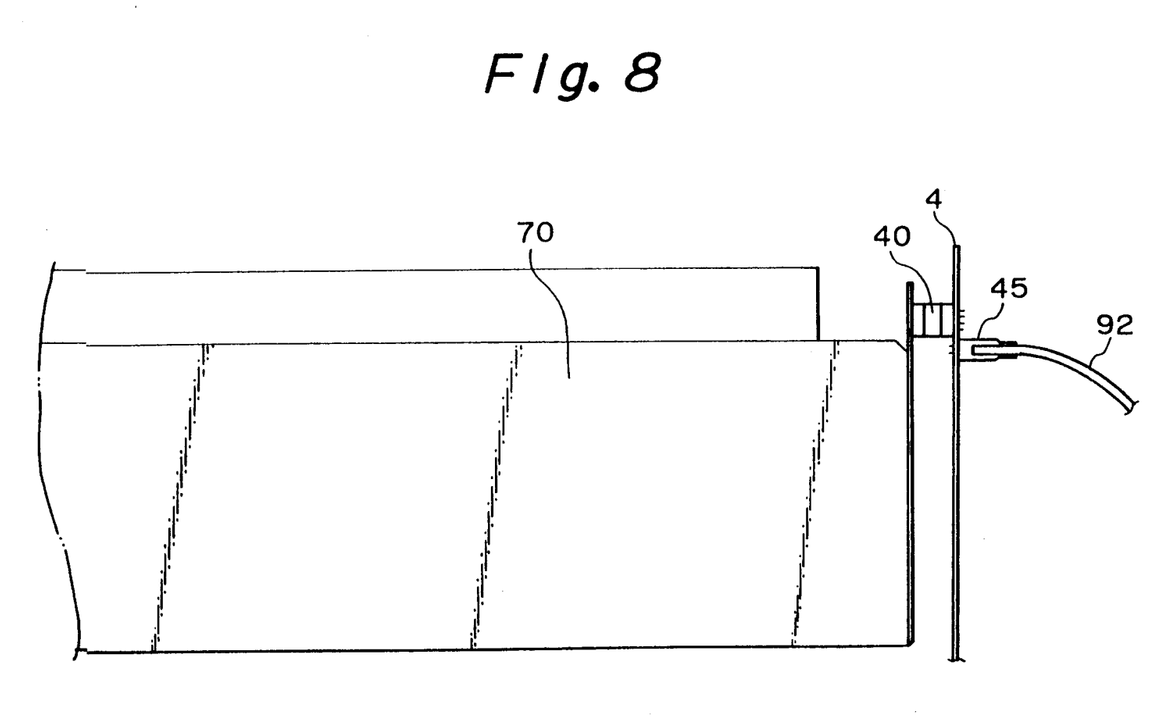
FIG. 8 shows the structure of a drive element, a mother board, and a connection coupling used for the arrangement shown in FIGS. 3A and 3B.

The structure of a drive element, a mother board, and a connection coupling used for the arrangement shown in FIGS. 3A and 3B is shown in FIG. 8.

Figure 9:
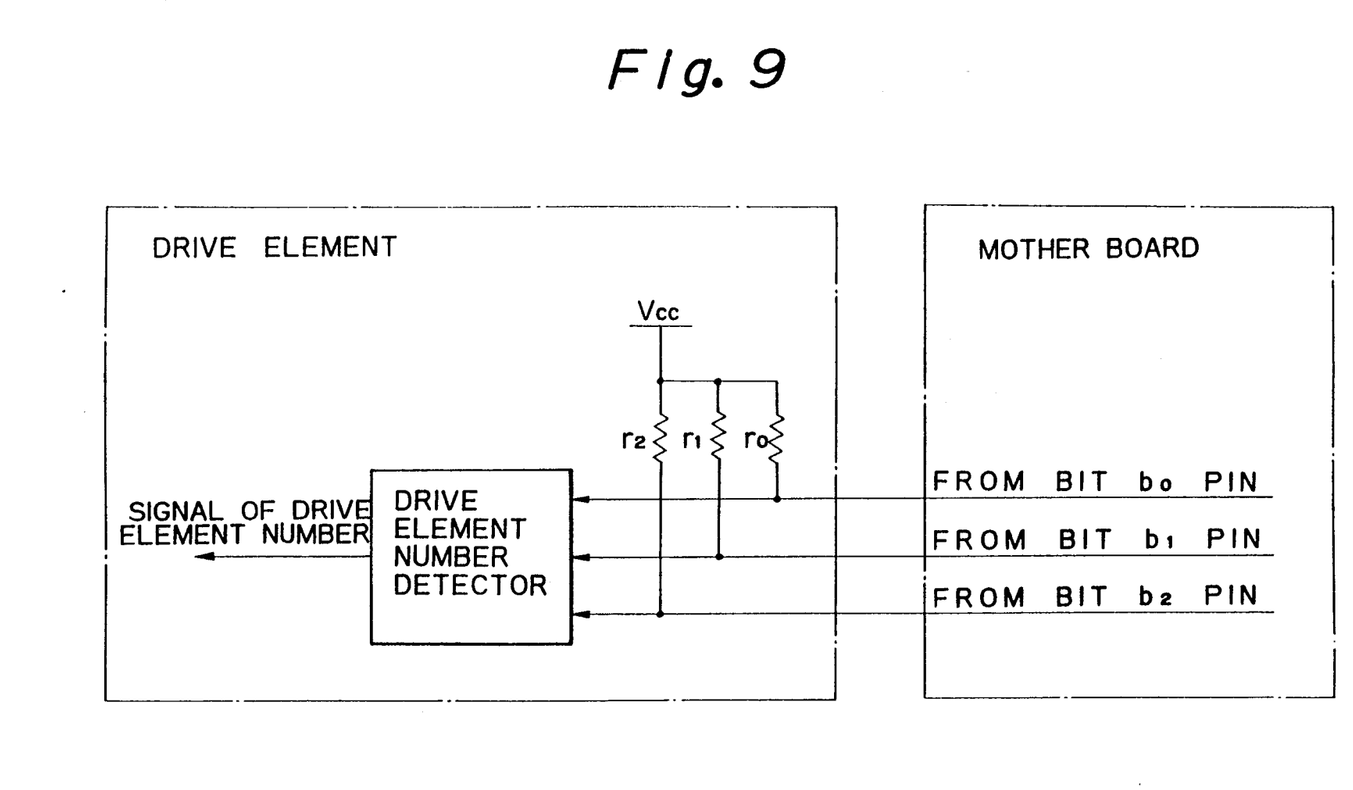
FIG. 9 shows a circuit for detecting the drive element number in a drive element applicable to the arrangement shown in FIG. 3A and 3B.
Figure 10:
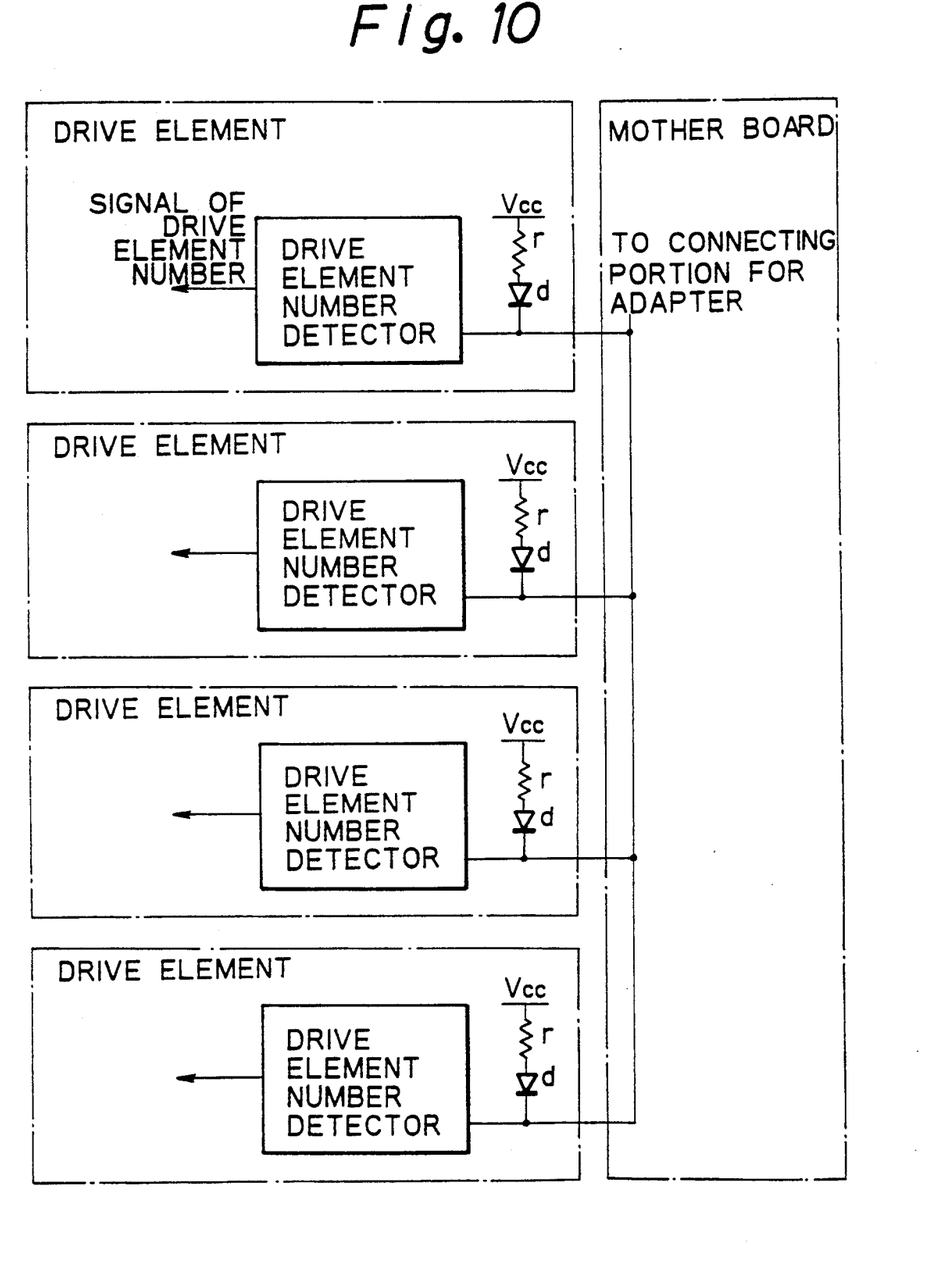
FIG. 10 shows another example of a circuit for detecting the drive element number in relation to a mother board applicable to the arrangement shown in FIGS. 3A and 3B.

An example of a circuit for detecting the drive element number in a drive element applicable to the arrangement shown in FIGS. 3A and 3B is shown in FIG. 9. Another example of a circuit for detecting a drive element number in relation to a mother board applicable to the arrangement shown in FIGS. 3A and 3B is shown in FIG. 10.

In the circuit of FIG. 9, pull up resistors $r_0$, $r_1$, and $r_2$ are connected to lines corresponding to the bit $b_0$ pin, bit $b_1$ pin, and bit $b_2$ pin, and form input lines to a drive element number detector. The drive element number detector delivers a signal of a drive element number in correspondence with the states of the bit $b_0$ pin, bit $b_1$ pin, and bit $b_2$ pin.

When the potentials of the bit $b_0$ pin and bit $b_1$ pin are at a LOW level, the bit $b_0$ pin and bit $b_1$ pin are connected to the ground in the mother board, and the potentials of the input signals to the drive element number detector corresponding to the bit $b_0$ pin and bit $b_1$ pin are at a LOW level.

When the potentials of the bit $b_0$ pin and bit $b_1$ pin are at a HIGH level, the bit $b_0$ pin and bit $b_1$ pin are in an OPEN state, the potentials of the input signals to the drive element number detector corresponding to the bit $b_0$ pin and bit $b_1$ pin are pulled up by pull up resistors $r_0$ and $r_1$, and the potentials of the input signals to the drive element number detector corresponding to the bit $b_0$ pin and bit $b_1$ pin are at a HIGH level.

The bit $b_2$ pins are connected in common, as shown in FIG. 4, and the pull up resistor $r_2$ is connected in parallel between the voltage source $V_{cc}$ and bit $b_2$ pin. The value of the resistance is $\frac{1}{4} \times r_2$.

When the potential of the bit $b_2$ pin is at a LOW level, a termination resistor is connected to the mother board. The value of resistance of the pull up resistor $r_2$ is selected such that the potential obtained by a voltage division between $\frac{1}{4} \times r_2$ and a resistance $r_t$ of the termination resistor is at a LOW level, so that the following inequality is established.

$$\{V_{cc}/(\tfrac{1}{4} \times r_2 + r_t)\} \times r_t < \text{LOW level}$$

When the potential of the bit $b_2$ pin is at a HIGH level, the bit $b_2$ pin is in an OPEN state in the mother board, the potential of the bit $b_2$ pin is pulled up by the pull up resistor $r_2$, and the potential of the input signal for the drive element number detector corresponding to the big $b_2$ pin is at a HIGH level.

In the circuit of FIG. 10, the pull up resistor r is connected between voltage source $V_{cc}$ and the line for the signal when the power source of the drive element is in an ON state, and is connected between the ground and the line for the signal when the power source of the drive element is in an OFF state. The bit $b_2$ pins are not connected in common in the mother board, and the states of the pull up resistors r are different when not all of the power sources of the drive elements are in an ON state, and thus a problem arises in that the level of the potential of the bit $b_2$ pin is varied. To prevent this problem, diodes d are connected between the pull up resistors r and the lines for the signals. Therefore, when the power source is in an OFF state, the signal line is electrically isolated from the pull up resistor r by the diode d, and accordingly, the HIGH level of the potential of the line for the signal is reliably maintained.

Instead of the use of two mother boards in the above-described arrangement, it is possible to use more than two mother boards, and where more than two mother boards are used, two connection portions for the mother boards are provided in each of mother boards, to enable a series connection of the more than two mother boards, additional bit $b_3$ pins are provided in the connection portions for drive elements in the mother boards, and are connected in common to an additional bit $b_3$ pin of the connection portions for the adapter in the mother boards, to enable the designations of the upper two bits $b_2$ and $b_3$ of the drive element number which are different between the more than two mother boards.

Instead of the use of four drive elements per each mother board in the above-described arrangement, it is possible to use more than four drive elements per each mother board, and where more than four drive elements are used per each mother board, the number of the connecting portions for the drive elements per each mother board, and the number of connection pins in the connecting portions for the drive element number designation, are increased.

I claim:

1. An apparatus for selecting a designated drive element from groups of drive elements, the apparatus comprising:
   control means for communicating to the drive elements;
   a first group of drive elements;
   a second group of drive elements;
   a first group of connecting means wherein each connecting means corresponds to a drive element from said first group of drive elements;
   a second group of connecting means wherein each connecting means corresponds to a drive element from said second group of drive elements;
   a first mother board, containing said first group of connecting means, for electrically coupling said first group of drive elements to said control means through said first group of connecting means;
   a second mother board, containing said second group of connecting means, for electrically coupling said second group of drive elements to said control means through said second group of connecting means;
   each of said corresponding connecting means including a plurality of connection terminals which correspond to bits that represent a drive element number such that the corresponding drive elemtns acknowledge their selection by comparing the drive element number, as communicated from the control means, to a logic level associated with said connection terminals, the associated logic levels of the connection terminals defining at least two lower bits and at least an uppermost bit of the drive element number for a given drive element
   whereby said first and second group of connecting means have a same connection terminal structure so that said first and second mother boards have a substantially identical connection structure.

2. The apparatus according to claim 1, wherein each of said first and second mother boards further comprise first connector means for coupling each mother board to the control means or an external termination unit and second connector means for coupling each mother board to other mother boards.

3. The apparatus according to claim 2, wherein connection terminals corresponding to the at least two lower bits of the drive element number are designated by coupling the corresponding lower bit connection terminals to a logical LOW level voltage potential or to a logical HIGH level voltage potential; and wherein
   all connection terminals defining uppermost bits on said first mother board are commonly coupled to a LOW level voltage potential or a HIGH level voltage potential by a connection to the external terminal unit and all connection terminals defining uppermost bits on said second mother board are commonly connected to each other but not connected to said termination unit such that logic levels for uppermost bits of the drive element numbers are different for said plurality of mother boards; and
   said first and second mother boards are connected in series to the control means through said second connector means.

4. An apparatus according to claim 3, wherein the voltage potential of the commonly connected terminals corresponding to the uppermost bit of one mother board is determined by connecting a termination resistor, which is external to the mother board, to the commonly connected connection terminals.

5. An apparatus for selecting a designated magnetic disk storage element from groups of magnetic disk storage elements, comprising:
   a plurality of groups of magnetic disk storage elements, each of which magnetic disk storage elements has a specifically designated drive element number;
   first and second mother board, each of said mother boards corresponding to one of said plurality of groups of magnetic disk storage elements;
   each mother board including a group of connecting means wherein each connecting means corresponds to a magnetic disk storage element from the corresponding group of magnetic disk storage elements such that said one of the plurality of groups of magnetic disk storage elements is connected to said first mother board, said another of plurality of groups of magnetic disk storage elements is connected to said second mother board, the second mother board is connected through a cable to said first mother board;
   each of said corresponding connecting means including a plurality of connection terminals which correspond to bits that represent the drive element number such that the corresponding magnetic disk storage elements acknowledge their selection by comparing a selected drive element number, as communicated from a control means, to a logic level associated with said connection terminals, the logic levels of the connection terminal defining at least two lower bits and at least an uppermost bit of the drive element number for a given drive element, such that the groups of connecting means have a same connection terminal structure so that the groups of connecting means on each of said first and second mother boards have a substantially identical lower bit and upper bit connection terminal structure;

the connection terminals corresponding to the uppermost bit being commonly connected on each of the mother boards;

and the apparatus having a termination resistor located externally to the second mother board and operatively connected to said commonly connected terminals of the second mother board to determine a logic level of said uppermost bit on the second mother board, so that different designations of the drive element number are possible by said first and second mother boards having the same connection configuration based on a presence/absence of the terminal resistor.

6. An apparatus according to claim 5, wherein said lower bits of the magnetic disk storage element number are designated by bringing potentials of a predetermined number of connection terminals to a logical LOW level voltage potential or to a logical HIGH level voltage potential;

said commonly connected connection terminals of each mother board are coupled to a LOW level voltage potential or a HIGH level voltage potential by a connection to said termination resistor such that logic levels for uppermost bits of the magnetic disk storage element numbers are different for said plurality of mother boards; and mother boards are connected in series to the control means.

7. The apparatus according to claim 6, wherein each of said first and second group of connecting means include at least four connecting means wherein each of the four connecting means couples to a separate drive element;

the logic levels of the lower bits of the magnetic disk storage element number are designated by connecting two connection terminals to either "HIGH, HIGH", "HIGH LOW", "LOW, HIGH", "LOW, LOW" or "LOW HIGH" logic levels so that the mother boards have a same terminal connection configuration, the logic level of the uppermost bit of the magnetic disk storage element number is designated by connecting another connection terminal of the connecting means in the first mother board to a first logic level; and the potential of the uppermost bit of the drive element number is designated by connecting said commonly connected connection terminals of the connecting means in said second mother board to a second logic level.

8. An apparatus according to claim 6, wherein the voltage potential of the uppermost bit of one mother board is determined by connecting a termination resistor which is external to the mother board to said commonly connected connection terminals.

* * * * *

UNITED STATES PATENT AND TRADEMARK OFFICE
CERTIFICATE OF CORRECTION

PATENT NO.　：　5,293,498
DATED　　　：　March 8, 1994
INVENTOR(S)：　Masahito Iwatsubo

It is certified that error appears in the above-indentified patent and that said Letters Patent is hereby corrected as shown below:

Column 7, line 67, delete "elemtns" and insert --elements--;

Column 8, line 24, after "commonly" insert --connected and are--;

Column 10, line 15, after "HIGH" (second occurrence) insert --,--;

Column 10, line 15, delete ""LOW-HIGH",";

Column 10, line 16, after "LOW" (second occurrence) insert --,--; and     Column 10, line 18, after "configuration" delete "," and insert --;--.

Signed and Sealed this

Ninth Day of May, 1995

*Attest:*

BRUCE LEHMAN

*Attesting Officer*　　　*Commissioner of Patents and Trademarks*